Aug. 9, 1966 P. J. SEVERINO ETAL 3,265,099

ACTUATING CIRCUIT SENSITIVE TO LOW CONDUCTANCE MEDIA AND CONTROL DEVICE USING SAID CIRCUIT

Filed Feb. 17, 1964 5 Sheets-Sheet 1

INVENTORS
PAUL J. SEVERINO
JAMES C. HALLIDAY
BY
Owen, Wickersham & Erickson
ATTORNEYS INVENTORS
PAUL J. SEVERINO
JAMES C. HALLIDAY
BY
Owen. Wickersham Erickson
ATTORNEYS Aug. 9, 1966 P. J. SEVERINO ETAL 3,265,099

ACTUATING CIRCUIT SENSITIVE TO LOW CONDUCTANCE MEDIA AND CONTROL DEVICE USING SAID CIRCUIT

Filed Feb. 17, 1964 5 Sheets-Sheet 3

INVENTORS
PAUL J. SEVERINO
JAMES C. HALLIDAY
BY
Owen, Wickersham & Erickson
ATTORNEYS INVENTORS
PAUL J. SEVERINO
JAMES C. HALLIDAY
BY
Owen, Wickersham & Erickson
ATTORNEYS

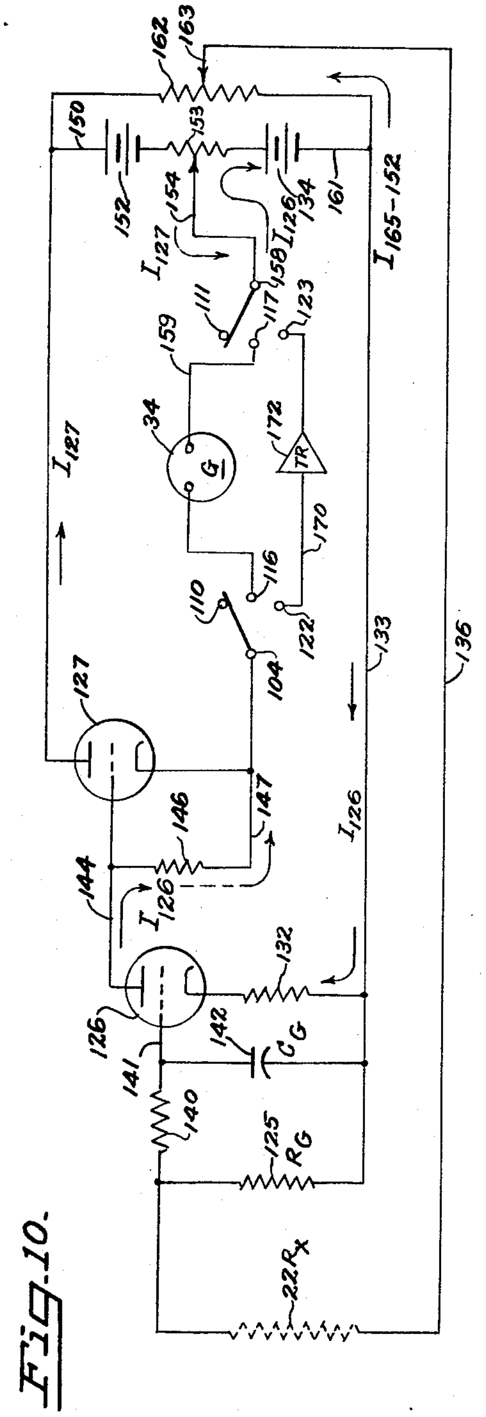
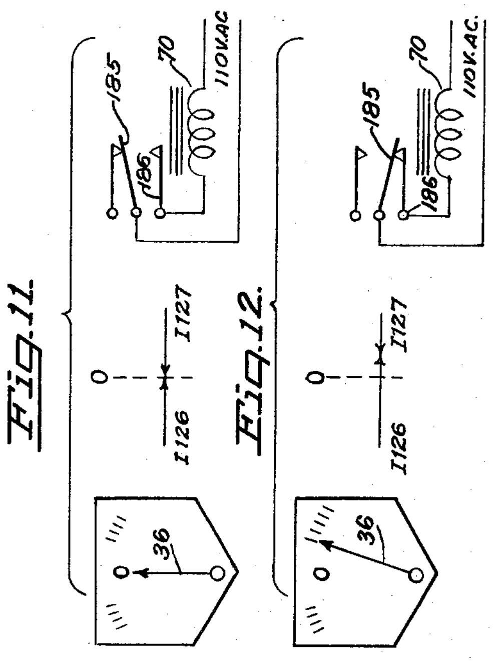
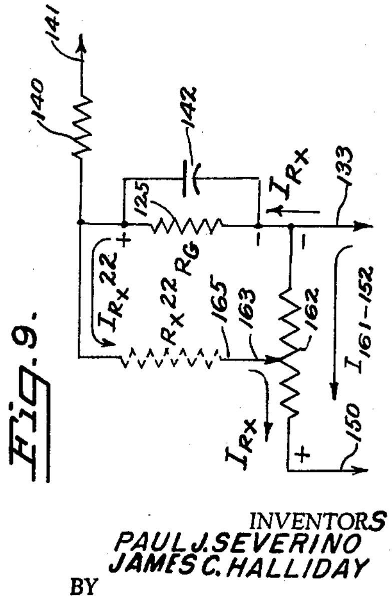
Fig. 10.  Fig. 11.  Fig. 12.  Fig. 9.
INVENTORS
PAUL J. SEVERINO
JAMES C. HALLIDAY
BY
Owen, Wickersham & Erickson
ATTORNEYS

United States Patent Office 3,265,099

Patented August 9, 1966

3,265,099

ACTUATING CIRCUIT SENSITIVE TO LOW CONDUCTANCE MEDIA AND CONTROL DEVICE USING SAID CIRCUIT

Paul J. Severino, 1701 Heron Ave., and James C. Halliday, 1779 Heron Ave., both of Sunnyvale, Calif.

Filed Feb. 17, 1964, Ser. No. 345,446
2 Claims. (Cl. 141—95)

This invention relates to a device for measuring incremental heights of a liquid or semi-liquid. The new device is of considerable aid in mixing materials.

One of the principal fields of use of the device of this invention is in the paint industry, where it is used to measure accurately each ingredient of a formula, which, when mixed, gives an exact color, tint, and shade. Its use is by no means limited to paints or even to products similar to paints, for it can be used for measuring incremental heights of many other kinds of materials, not even being limited to the measurement of liquids. Yet its use is probably most conveniently illustrated by considering the problem of paint mixing.

For example, paint manufacturers often carry a line of industrial paints, such as automobile paints, in which each color has to match an existing paint, so that it has to be blended very carefully. While the manufacturer could prepare at his plant several hundred, or possible several thousand, batches, each of a different shade or color, to match every color of automobile and could send cans of each to each distributor, this would be a wasteful system, for the distributor might never have a call for most of the colors. A far more economical system, which this invention makes possible, is to have each jobber mix his own paint, being furnished by the manufacturer with a much smaller stock of basic ingredients and a set of formulas for matching any particular color and shade, for all automobile and industrial colors have been or can be assigned a standard number. Thus, by knowing the year and model of a car and the manufacturer's color designation, the jobber can look it up in his formula book. Then he can take from his stock the relatively few ingredients needed for each formula (usually between three and six) and can readily achieve any mix needed.

However, the mixing must be done very accurately. Normally, such paint is sold in pint, quart, and gallon sizes, and it is of considerable convenience to be able to mix the paints in the can to be used. These small amounts make the accuracy more difficult to achieve, but mixing in small amounts in the economical way to solve the problem of being able to supply each formula. Each ingredient can be added directly into the can, and the can placed in a shaker to complete the mix. The present invention makes it possible to do the measuring and proportioning in the can with all the needed accuracy. A device of this invention can be adapted at the time of its manufacture for use with as many different sizes of standard cans as desired. The sizes mentioned—pint, quart, and gallon—will be used in this description by way of example. The device can, of course, be adjusted to reflect different units of measurement, such as the units based on the imperial gallon or on the metric system. Also, fractions of any standard for which the machine is set can be measured in the containers for which the machine is designed.

A very important object of the invention is the achievement of an extremely high degree of accuracy in the proportioning of the paint. The device permits a detectable change with only one drop of paint in a gallon can.

This invention is a combination of mechanical and electronic features, and both are important. Basically it may be said that the invention utilizes a probe rod which is set initially at the bottom of the can and is then raised to the height of desired fill for the first ingredient; an incremental metering device shows exactly the height to which it is to be raised, and a readout, indicating, or control device is actuated when the material touches the probe rod tip. When the first ingredient is poured in, the readout, indicating, or control device indicates when the volume called for by the formula has been exactly reached, to within a single drop. The rod is then raised to the incremental height to which the batch should rise when the next ingredient is added, and so on until each ingredient has been added in exactly the right amount. Each time, the accuracy may be achieved to within a single drop.

An important difficulty which had to be solved in order to provide the desired accuracy and dependability, arose from the fact that paint and its vehicles are very good insulators, especially synthetic enamels. They have a very low specific conductivity, and the problem was to provide an electronic sensing device which would function accurately and with positive reliability, under conditions where the resistances are thousands of megohms, up to about half a million megohms.

It will already be apparent from the foregoing description that the device is not limited to paint, but that it can be used wherever there is an advantage in reading the specific conductivity of materials and wherever height levels, volumes, and so on are to be read. Materials having higher conductivity are even easier to manage and occasion much less difficulty than the example of paint which has been given and which will continue to be used herein. Still, it is worth mentioning the versatility of the invention. It may be used as an impedance device and for many other uses.

Another object of the invention is to eliminate, as much as possible, the human element in color mixing. In order to achieve this object, the invention provides an automatic system that does away with having the operator hold and pour the paint, and it does not rely on mechanical dispensing meters, whose accuracy is always liable to be faulty. Consistency and accuracy are important attributes of the invention.

Speed is another important factor, and the invention has a very fast response characteristic.

Other objects and advantages of the invention will also appear from the following description of a preferred embodiment, described in connection with its use in mixing paints, but, as said before, not limited to that, even in this specific embodiment.

In the drawings:

FIG. 9 is a simplified circuit diagram used in explaining the operation of the circuit of FIG. 8.

FIG. 10 is another simplified circuit diagram, more inclusive than FIG. 9, used in explaining the operation of the circuit of FIG. 8.

FIG. 11 is a diagrammatic view explaining meter operation and automatic shut-off operation relative to a vector diagram, showing the zero position where the two pertinent currents are balanced.

FIG. 12 is a view similar to FIG. 11 showing what happens when the two pertinent currents are no longer balanced.

*Brief description of the operation*

Figure 1:
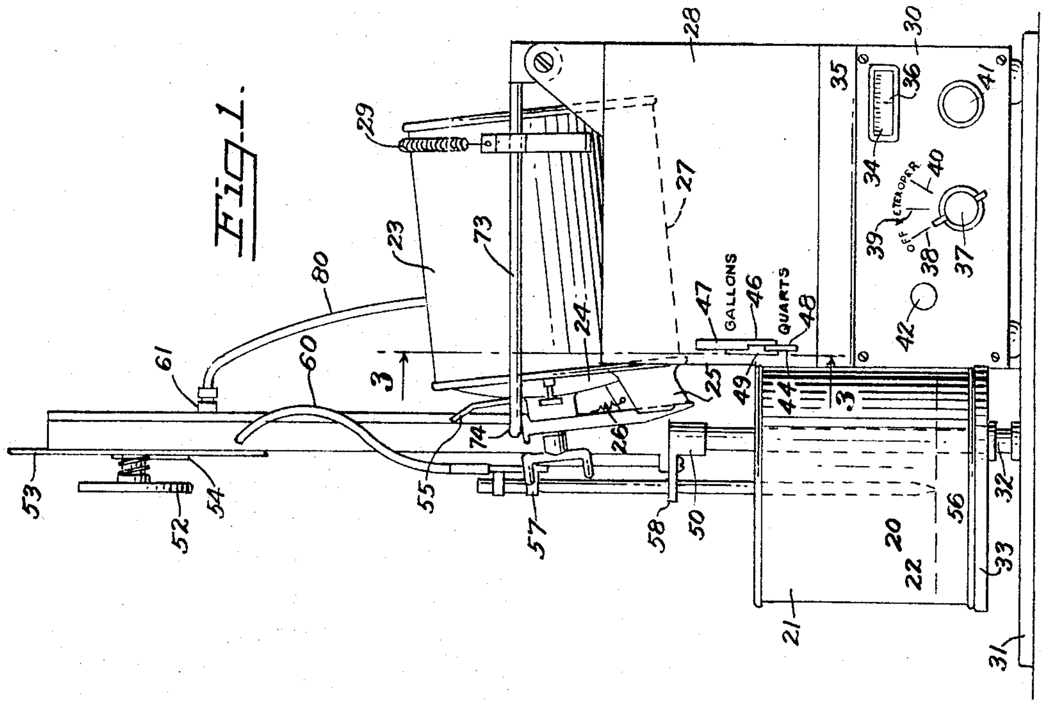
FIG. 1 is a view in front elevation of apparatus embodying the principles of the invention in use for indicating when a desired amount of paint has been dispensed from a dispensing can into a can that is to contain a mixture.
Figure 2:
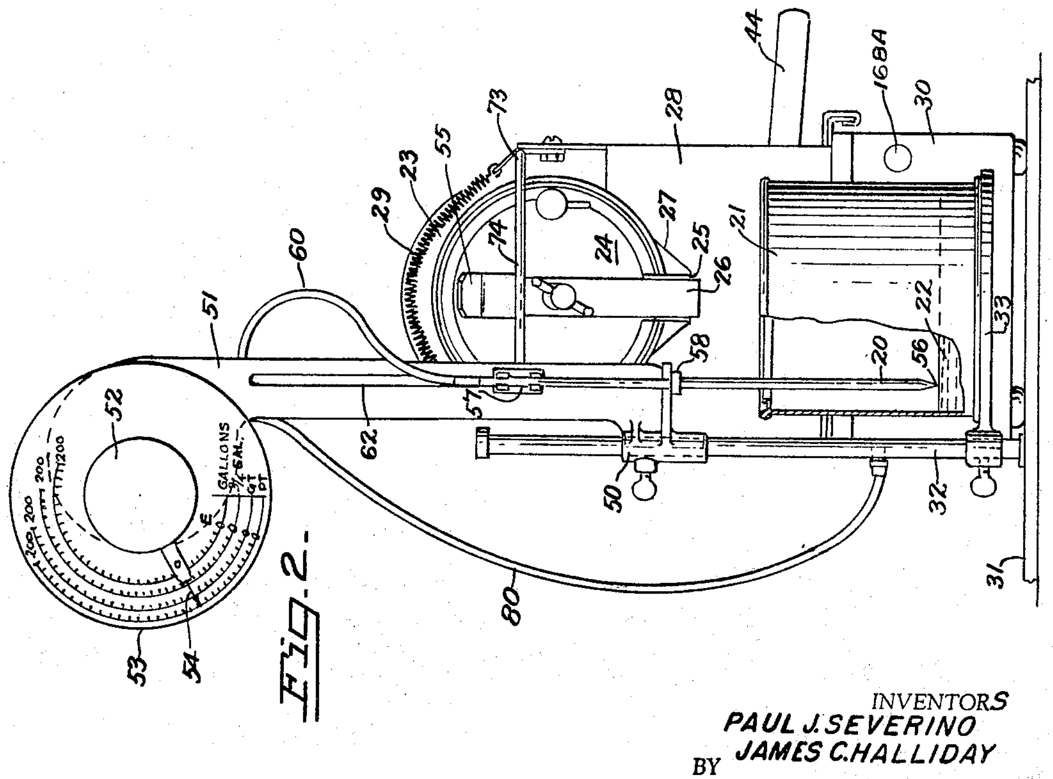
FIG. 2 is a view in elevation and partly in section, looking from the left-hand side of FIG. 1 with a portion of the paint-receiving can broken open to show the position of the probe.
Figures 3, 4:
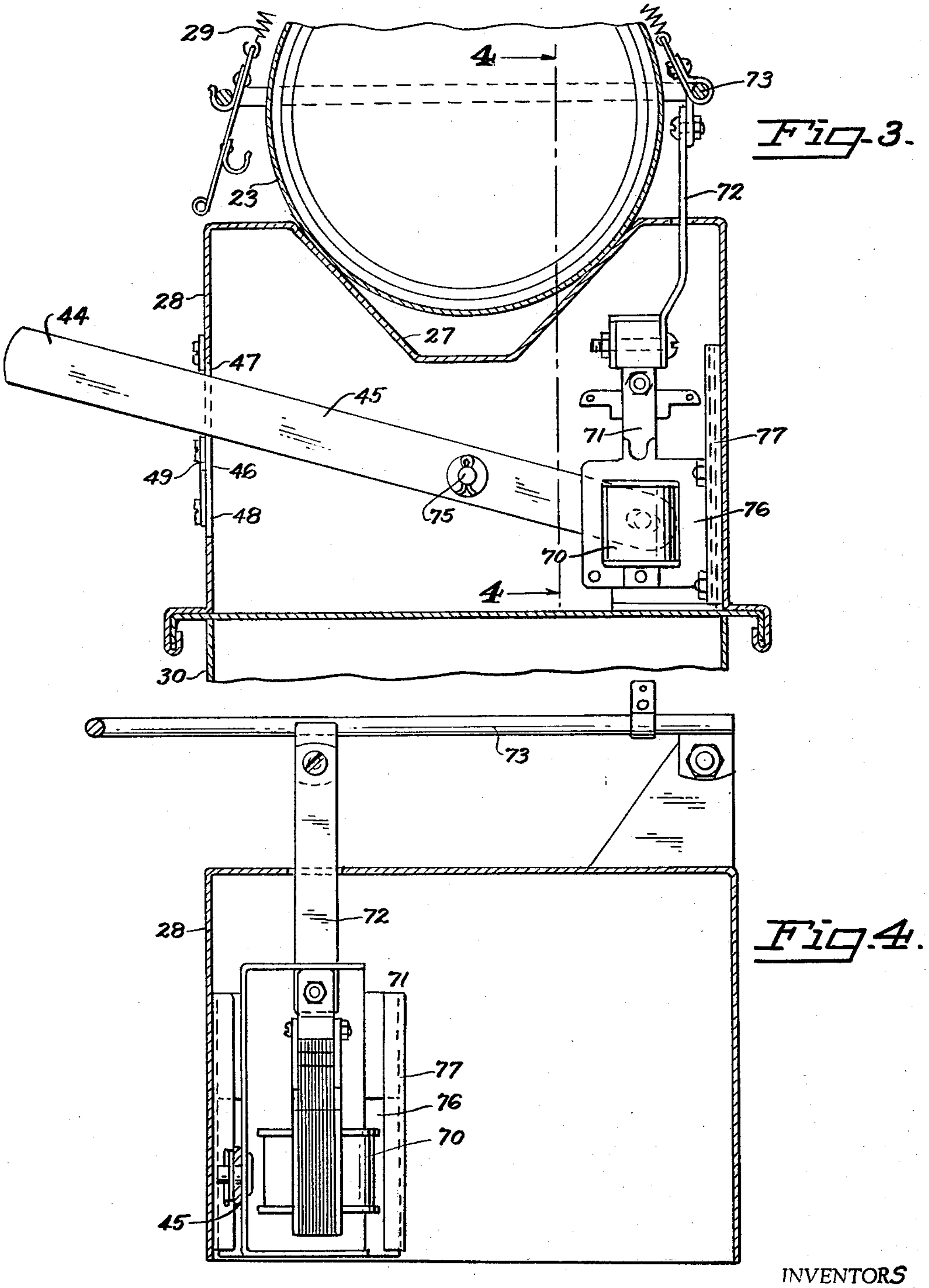
FIG. 3 is a view on an enlarged scale in elevation and in section taken along the line 3—3 in FIG. 1, the upper portion being broken off, to conserve space.
FIG. 4 is a view in elevation and in section taken along the line 4—4 in FIG. 3.
Figures 5, 6, 7:
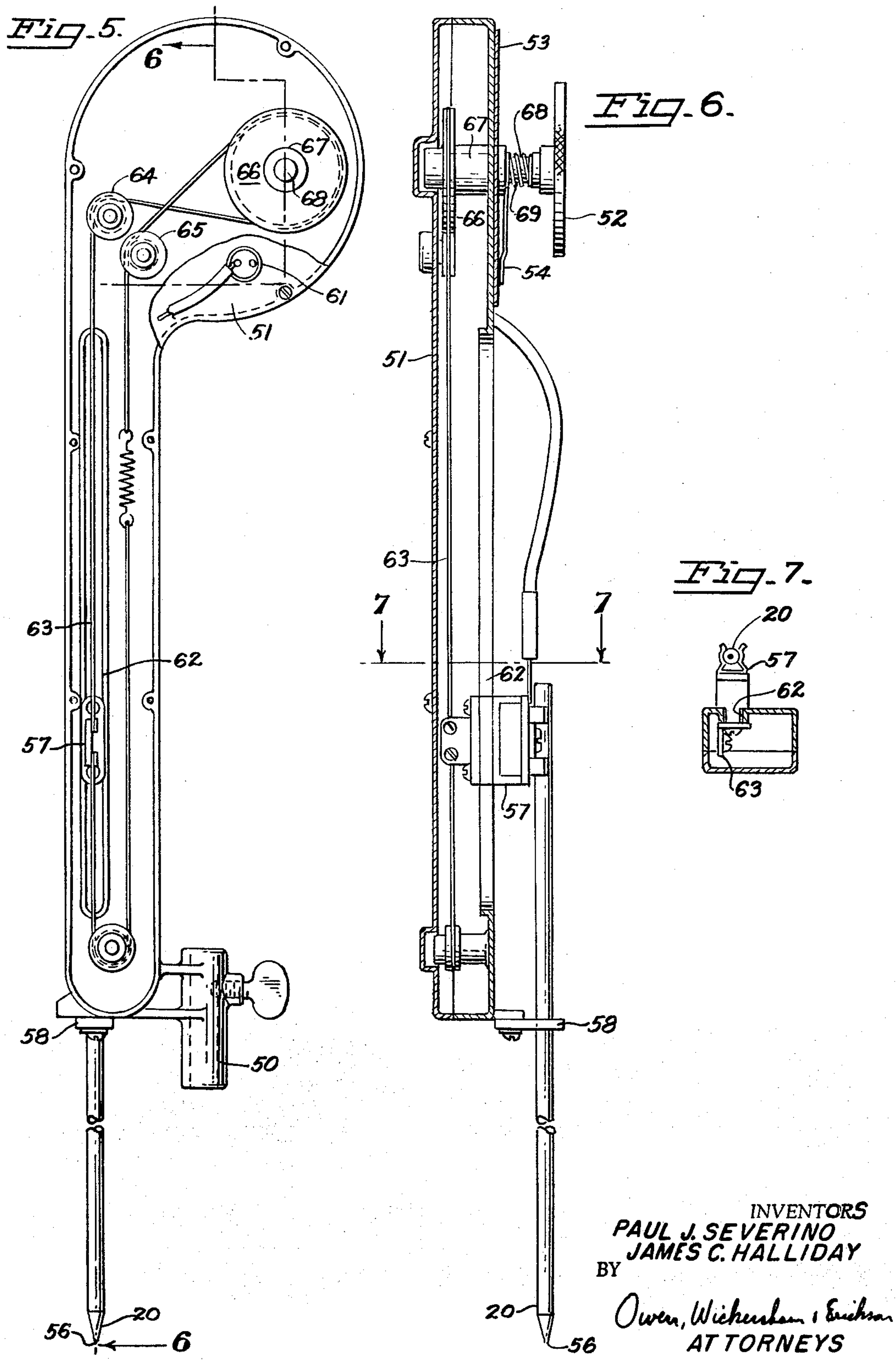
FIG. 5 is a view in elevation, with the cover plate removed, of the probe and reel device, the probe rod being broken in the middle in order to conserve space.
FIG. 6 is a view in elevation and in section taken along the line 6—6 in FIG. 5.
FIG. 7 is a view in horizontal section taken along the line 7—7 in FIG. 6.

The embodiment of the invention shown in the drawings may be termed an electronic color-formulation gauge. It is very fast and accurate, and it eliminates the human element in color mixing.

A sensing probe 20 extends down into a can 21 in which paint 22 is to be sold and delivered. The various colors are added from a series of ingredient-dispensing cans 23, each containing one color of paint. Each dispensing can 23 is provided with a lid 24 having a pouring spout 25 with a sliding shutoff valve 26. When any can 23 is used, it is set in a cradle support 27 provided by a housing 28 and is held by a coil spring 29 in a tilted position, so that paint will pour out freely through the spout 25 when the valve 26 is open.

A small D.-C. voltage is applied between the probe 20 and the can 21 being filled. When the paint vehicle 22 reaches the probe 20, a minute current flows through the paint vehicle 22; this current is fed to a special balancing circuit, a resultant output is amplified, and the amplified output is fed to a relay system. The relay system, in turn, supplies the electrical energy needed to operate a solenoid-controlled shutoff device.

As far as the jobber who actually uses the device is concerned, the device is simple in appearance and operation, for of course, he is usually not particularly concerned with the inside workings of the machine. As he sees it, the machine has an instrument housing 30 which may sit on any convenient counter, table, or bench 31, whether of metal or wood, that also supports gallon-size cans 21, when those are used. (A standard 32 with a support disk 33 holds cans 21 of the quart or pint size when the paint 22 is to be mixed in them.) The housing 30 supports the housing 28 and also carries a gauge 34 which is marked to show a central zero or null point 35, and there is a needle 36 which, when the instrument is operated in "meter" position, moves to show that the actual level has been reached. A three-position knob 37 projects from the side of the housing 30, and the housing adjacent the knob 37 carries three indicium points 38, 39, and 40 which may be marked "Off," "Meter," and "Operate," respectively. In the "Off" position 38 the entire circuit is off; the "Meter" position 39 is used in conjunction with a zero-adjust knob 41 to place the needle 36 on zero 35, and the knob 37 is turned to the "Operate" position 40 for automatic shutoff measurement of the ingredients of the paint mix. A light 42 comes on when the knob 37 is in either of positions 39 and 40, to show that the device is on.

Also, a handle 44 of a shift lever 45 extends out through an opening 46 on the housing 28 of the machine. The upper part 47 of the opening 46 is labeled for gallons, while the lower part 48 is labeled for quarts, and the operator pushes the handle 44 to the position corresponding to the can 21 he is using. A separating stop 49 divides the openings 47 and 48, and the handle 44 is pushed to the side in order to move it from above the stop 49 to below it, or vice versa.

The standard 32 carries, in addition to the can platform 33, an adjustable sleeve clamp 50 that supports a casing 51 in which the mechanism for moving the probe 20 is housed. A knob 52 enables the operator to raise and lower the probe 20, while the height of the probe 20 is shown upon a calibrated dial 53 by a needle 54. The dial 53 may have several scales to represent several sizes of cans 21.

The operator merely sets the can 21 on the table 31 or on the platform 33, depending on the size of can, with the probe 20 extending into the can 21. To use the machine, the operator turns the knob 52, which acts to raise or lower the probe 20. As the knob 52 turns, the pointer 54 shows on the dial 53 the vertical position of the probe 20, reference being made to the proper calibrated scales. When the probe 20 touches the bottom of the can 21, with the knob 37 in the "Meter" position 39, a full scale deflection of the meter needle 36 is noted. Then, the operator may adjust the dial pointer to "E," which establishes the can zero. Next he moves the pointer 54 to "0" on the dial 53, thereby raising the probe 20, and then switches the knob 37 to the "Operate" position 40.

At this stage, the operator adds a drier or thinner, depending on whether a lacquer or enamel is being mixed, from a can 23, automatic shutoff being obtained in the manner described below when the drier or thinner rises to the level of the probe 20 and touches its tip 56. If desired, the operator may then recheck this position by raising the probe 20 above the liquid level and then lowering it slowly until contact is made and then adjusting the pointer 54 for exact "0" indication on the scale dial 53. An exact zero reference for the formula colors is then achieved.

Next he turns the knob 52 to raise the probe 20 and the needle 54 to a height shown on the dial 53 that reflects the correct number for the first ingredient. With a dispensing can 23 for the first ingredient in the cradle 27, and the coil spring 29 in place over that can 23, he opens the valve 26 by means of a spout crank handle 55 and paint pours from the can 23 into the can 21 until the level rises to touch the lower end of the probe 20, and at that time the valve 26 is closed by a shutoff arm 73 described below. Then he turns the knob 52 to raise the probe 20 to the next correct needle height, as shown by the needle 54 and dial 53, puts the can 23 for the next ingredient in the cradle 27, puts the coil spring 29 in place over the can 23, and opens its valve 26. Again paint flows into the can 21 until it reaches the level of the probe 20 and the valve 26 is closed. The operator continues in this way until all ingredients are in the can 21, at which time the mixture is complete.

*The sensing probe 20 and its accompanying elements*

With this general operation in mind, we now turn to the mechanical aspects of the invention. After they have been described in detail, the electronic circuit will be described. It will already be evident that the probe 20 acts as an electrode and that the wall of the paint can 21 acts as the other electrode, the electrodes 20 and 21 being on two opposite sides of an electrical conductance provided when the paint vehicle 22 touches the probe 20 as well as the can 21. The electrode 21, the can itself, may be considered to be at ground potential, the can 21 being grounded through the paint support device 33 or the base 31, as is the other side of the electronic circuit. A small D.-C. voltage is applied between the probe 20 and the can 21. The air gap between them is sufficient so that there is substantially a broken circuit so long as the only connection is by air. However, the paint vehicle 22 is enough more conductive than air to make a very marked change in conductance, although it itself has a large resistance. Nevertheless, the minute current which is able to pass through the paint vehicle 22 when the paint vehicle 22 rises to the point 56 of the probe 20 is sufficient when amplified through the circuit of this invention and fed to a relay system to supply the necessary electrical energy to operate the shutoff solenoid.

The sensing probe 20 comprises a metal rod, which may be of steel, copper, brass, or aluminum, and it is arranged so that it can be moved up and down by a lifting mechanism associated with the knob 52 and the needle 54. The lower end 56 of the probe 20 can be of any desired shape to get any desired type of reaction. For the use herein, it may be a sharp-pointed needle. The probe 20 is insulated from the lifting mechanism, being supported by an insulated carriage-clamp 57 and is steadied by an insulated guide 58. A shielded wire lead 60 leads from the probe 20 to a connector 61 at the rear of the housing 51. The carriage-clamp 57 is slidably mounted in a guideway 62 and is secured to an endless cable 63. The cable 63 passes over pulleys 64 and 65 and around a main pulley 66 which is secured to a sleeve 67. The knob 53 is secured to a shaft 68 that passes through the sleeve 67 and is secured to the needle 54. A spring clutch 69 normally causes the sleeve 67 to move with the shaft 68, but the knob 53 may be pushed to disengage the needle holding device from it for adjusting the needle 54 to a zero point. Normally turning the knob 53 acts through the pulley 66, cable 63, and carriage clamp 57 to raise and lower the probe 20 while also turning the indicator needle 54. The needle 54 is set to the "E" position by disengaging the spring clutch 69 when the point 56 of the probe 20 touches the bottom of the paint can 21, so that every further raising is reflected on the scale.

*The shutoff device*

The mechanical portion of the shutoff device comprises an electrical solenoid 70 and a metal core 71 which is pulled into the solenoid 70 upon its energization. The core 71 is pivotally secured to a connecting link 72 that is pivoted to a shutoff lever 73 which has a portion 74 engaging the closure valve 26. When the solenoid 70 is de-energized, the valve 26 may be opened, the shutoff lever 73 moving up freely, but when the solenoid 70 is activated, it pulls the lever 73 down, and the valve 26 is at once closed.

The shift lever 45 has a pivot 75 near the middle of the housing 28 and the end opposite the handle 44 is connected to a carriage 76 for the solenoid 70. The carriage 76 rides vertically on guides 77; since the lever 45 is either in its upper position or lower position, moving of the lever 45 from one to the other changes the base position of the solenoid 70 and therefore the location of the stroke of the solenoid core 71 and of the shutoff lever 73. The device is made and scaled so that there is one position for gallon cans and another for quart cans. Further positions for different sizes of cans may, of course, be added if that is desired.

Figure 8:
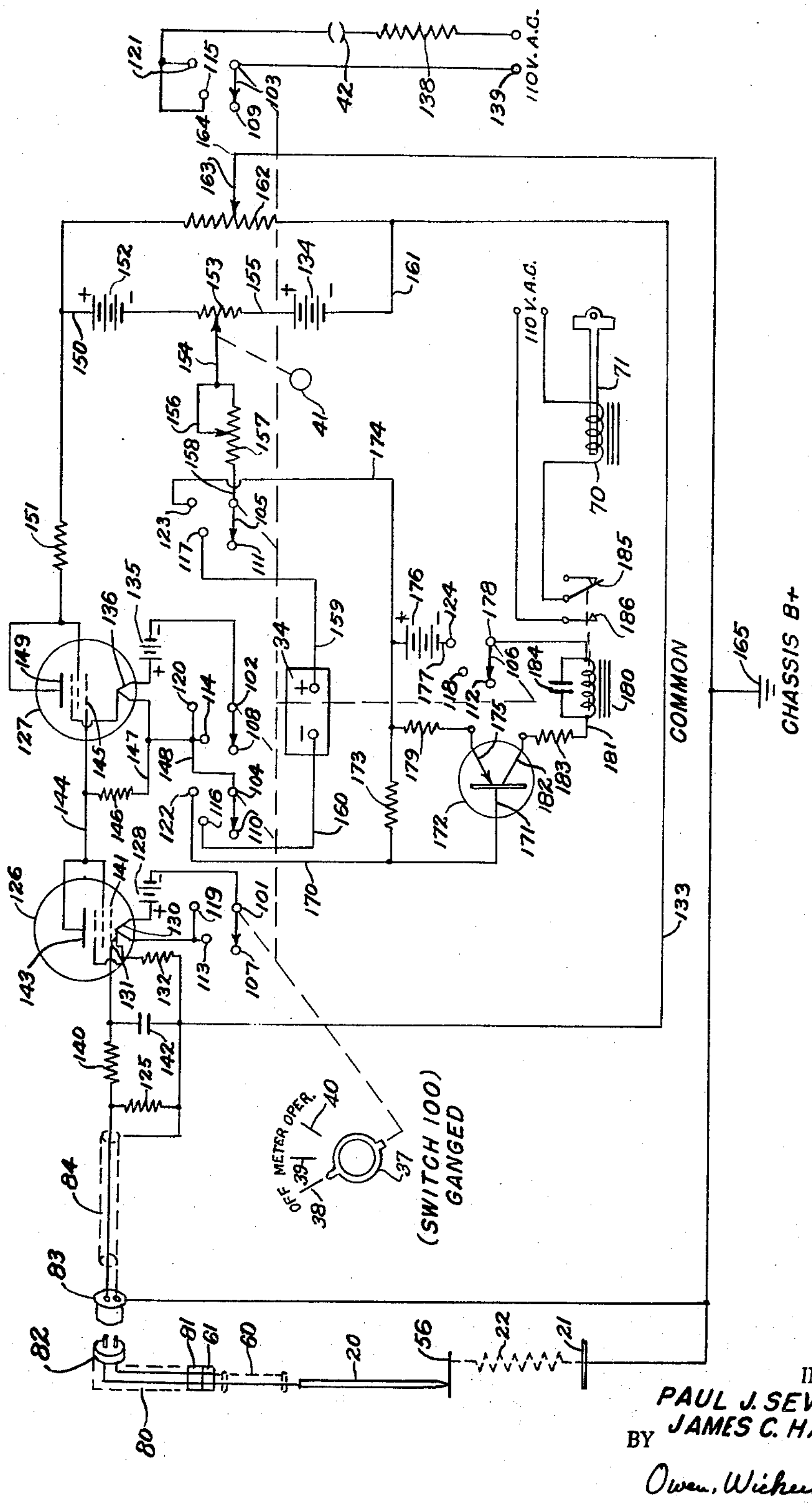
FIG. 8 is an electrical circuit diagram of the electric circuit of the invention.

The shutoff arm 73 and the spring 29 act together, the spring 29 acting to hold the can 23 in its proper position, to give the shutoff arm 73 a load to work against, and to adjust the shutoff arm 73 to its proper height. Similarly, the lever shift control 45 adjusts the shutoff arm 73 to the quart or gallon pouring can sizes. The solenoid 70 may be any 110-volt 60-cycle A.-C. device (or on any other suitable type of power supply), and it is operated from a relay device as shown in FIG. 8 and as will soon be described.

*The electronic circuit (FIGS. 8 to 12)*

The circuit provides a remarkable sensitivity, enabling the measurement of very small currents and very large resistances—many megohms—while using a very low applied input signal voltage. The resultant output may be amplified to actuate relays or any type of readout mechanism desired.

Thus, in our example of paint mixing, the height in the can 21 is read on the gauge 34 as a conductance, which may be termed $R_x$, the conventional symbol used to mark an unknown resistance, this being the resistance measured between the paint can 21 and the probe 20.

The connector 61 joins the shielded wire lead 60 to a shielded lead 80 by a connector 81. A connector 82 on the other end of the lead 80 is connected to a connector 83 on a shielded lead 84 inside the housing 30.

Referring now to the circuit of FIG. 8, the knob 37 operates a ganged six-pole three-position switch 100 having poles 101, 102, 103, 104, 105, and 106, each with three contacts. Contacts 107, 108, 109, 110, 111, and 112 are the "Off" position contacts, corresponding to the position 38 of the knob 37. Contacts 113, 114, 115, 116, 117, and 118 are closed when the knob 37 is in the "Meter" position 39. Contacts 119, 120, 121, 122, 123, and 124 are closed when the knob 37 is in the "Operate" position 40. Note that the contacts 113 and 119 are connected together electrically, as are the contacts 114 and 120 and as are the contacts 115 and 121; thus, so far as the switchpoles 101, 102, and 103 are concerned, the change in the knob 37 from the "Meter" position 39 to the "Operate" position 40 makes no difference whatever. There is a change however in the corresponding positions of the switchpoles 104, 105, and 106, where there is a great change in circuits. Fundamentally the "Meter" circuit is the same as the circuit described in our earlier-filed copending application, Serial No. 176,655, filed March 1, 1962. The switch pole 103 is merely used to connect the neon lamp 42 through a load resistor 138 to a source 139 of 110 volt A.-C.

The "Operate" circuit, however, is new, and connects the signal lead to a transistor 172 which provides an amplification factor of about one hundred, so that when the paint vehicle 22 forms a conductive path between the probe 20 and the can 21, the unbalance condition produces sufficient amplification of current at the transistor collector circuit to be able to energize a relay coil 180 and close a relay switch 185 against a contact 186, all as explained below. The relay switch 185 is connected to one pole of the solenoid 70 and the contact 186 is connected to the other pole through a 110 volt A.-C. source. Hence energization of the coil 180 actuates the solenoid 70, moving the shutoff lever 73.

In both the "Meter" and "Operate" circuits, a suitable standard resistance 125, which may also be referred to as $R_G$, is to be compared with the $R_x$ resistance of the paint vehicle 22. A suitable $R_G$ resistance 125 may be 88 megohms, or some value from 80 to 100 megohms.

The circuit balances or unbalances the plate currents of two vacuum tubes 126 and 127 against each other. The tubes 126 and 127 may be 3S4 tubes (although other tubes or transistors may be used). The switch pole 101 is connected to one side of a 1.5 volt battery 128, and the other side of the battery 128 is connected to the filament 130 of the tube 126. A suitable bias for cathode 131 of the tube 126 is provided by a suitable resistor 132 which is connected by a lead 133 to the negative or $B^-$ side of a battery 134 (45 volts); or to some other suitable power supply, including rectified A.-C.; the resistor 132 may have a value of 3,300 ohms. The two "On" contacts 113 and 119 for the switch pole 101 are connected together and to the filament 130.

There is a similar setup for the second tube 127. The switch pole 102 is connected to a battery 135, which is connected to a filament 136 for the tube 127. The contacts 114 and 115 for the switch pole 102 are connected together and to the other side of the filament 136.

The lead 60 from the probe 20 is connected through the plug 61 and the cable 80 (leading from the case 51 to the case 30) and the lead 84 to a resistor 140 which may be 3.3 megohms, for example, to the grid 141 for the tube 126, with a condenser 142 to the lead 133, which acts as a floating ground, to bleed off any A.-C. or pulsating D.-C.; the value of the condenser 142, for example, may be 100 micro-microfarads. Thus, the contact of the probe 20 with the paint drives the tube 126, and it will drive the tube 126 more positive when the small actual conductance of the paint vehicle is between the can 21 and the probe 20 than when there is only air there. The plate 143 of the tube 126 is connected by a lead 144 to the grid 145 for the tube 127. A plate load resistor 146 connects the line 144 to a lead 147 to the contacts 114 and 120 and to a lead 148 to the pole 104. The resistor 146 may have, for example, 3,300 ohms. Thus the plate current of the tube 126 controls the bias for the second tube 127, so that the plate current of the tube 127 is decreased by an increase in the plate current of the tube 126. In operation, the tubes 126 and 127 are set to be balanced when the value of $R_x$ is infinity (air gap between the can 21 and probe 20) and is unbalanced by the decrease in $R_x$ resulting from paint providing a finite conductance, though it is what is normally thought of as large resistance, between the can 21 and the probe 20.

From the plate 149 of the tube 127 a lead 150 extends through a resistor 151, which may have a value of 6,800 ohms, to a B battery 152 of suitable size, such as 45 volts. The other side of the battery 152 is connected to one end of a potentiometer 153 having, for example, a 5,000 ohm basic size and having a tap 154 adjustable to obtain a desired value, by means of the knob 41, to set the meter needle 36 at zero after the tubes 126 and 127 warm up. The other end of the potentiometer 153 is connected by a line 155 to the battery 134, of the same size as the battery 152, the other side of which is connected to the bus 133 that provides the floating ground. The tap 154 is connected to a separately adjustable tap 156 for a potentiometer 157 (e.g., a 5,000 ohm potentiometer) which is set at the factory. From the potentiometer 157 a lead 158 goes to switch pole 105. When the switch 100 is in its "Meter" position, the switch pole engages the contact 117 and is connected by lead 159 to the meter 34. At the same time, a lead 160 connects the gauge 34 via the leads 148 and 147 to the filament 135 of the tube 127 and to the resistor 146.

Thus the gauge 34 receives plate current from the tube 126 through the resistor 146 and receives plate current from the tube 127 through the resistor 151, battery 152, and potentiometers 153 and 157. The gauge 34 measures the degree of balance or unbalance of the tubes 126 and 127, as affected by $R_x$.

The circuit for the tube 126 is thus complete through the lead 144 to the plate load resistor 146, through the lead 160 to and through the meter 34 to the leads 159 and 158 and the meter-limiting resistor 157 and thence to the lead 154 and back down, through the 45-volt battery 134. The battery 134 is in series iwth the zero-adjustment resistor 153 and the other 45-volt battery 152 which form a series voltage supply. The cathode 135 of the tube 127 is 45 volts above the floating ground 133, and its plate voltage is supplied by the 45-volt battery 152. The other side of the battery 134 is connected by a lead 161 through a (floating grounded) variable resistor 162 whose tap 163 is connected to the metal case 30 through a lug 164 to a common line 165 of the case 30, serving for sensitivity to give about a 33-volt current. A screw 167 and an access hole 168 in the case 30 enable adjustment by a screwdriver.

Reference will now be made to simplified circuits shown in FIGS. 9 and 10. So far as the input sensing circuit of FIG. 10 is concerned, the circuit can be considered as being substantially that of FIG. 9. The condenser 142 is connected in parallel with the $R_G$ resistor 125 which forms and completes a series circuit with $R_x$ (the paint vehicle 22 or the air gap when no paint vehicle touches the probe 20) and also includes that portion of the control rheostat 166 between its center arm 167 and to the common line 133. The grid 141 of the tube 126 is connected through the isolation resistor 140 to both $R_x$ and $R_G$. The purpose of the condenser 142 is to prevent stray voltages from causing instability in the function of tube 126.

The simplified circuit of FIG. 10 shows the novel circuit in simple terms. The $R_x$ resistance 22, the $R_G$ resistor 125, the control rheostat 162, and the condenser 142 are shown as in FIG. 9, but more of the complete circuit is shown. The plate current from the tube 126 is called $I_{126}$, that from the tube 127 is called $I_{127}$. These currents meet and oppose each other at the galvanometer 34 when the knob 41 is in the "Meter" position 39. When there is no liquid to give $R_x$ a finite value, the circuit is set so that $I_{126}=I_{127}$, as shown in FIG. 11 by a simple vector diagram. The gauge needle 36 is then pointing to zero, its normal position. (If it does not, it is adjusted to zero by turning the knob 41 to adjust the resistor 153 which controls the voltage supplied to the plates of the tubes 126 and 127, increasing one while decreasing the other.) The resistor 157 is a meter-current limiting resistor that is factory adjusted for desired meter action. As the definite and finite $R_x$ enters the circuit due to the vehicle 22 touching the probe 20, the balance of the input circuit is affected. The result of $I_{R_x}$ (ref. dia. 9) which flows through the $R_G$ voltage divider 125 and the $R_x$ resistance 22 produces a voltage drop across the $R_G$ resistor 125. This small positive voltage at the grid 141 of the tube 126 causes the current $I_{126}$ to increase while the current $I_{127}$ decerases, due to the increases in tube 127 bias resulting from $I_{126}$ passing through the resistor 146; FIG. 12 shows the vector analysis. Thus the galvanometer needle 36 moves steadily in accordance with the amount of current imbalance, recording the amount of imbalance. This balance or imbalance depends upon the material of the vehicle 22 ($R_x$) and its contact with the probe 20, the vehicle 22 traveling progressively up the point along the contour of the tip 56 (which may be exponential as described in our previous patent application, Serial No. 176,655). The visual use of the galvanometer 34 in this manner serves to extend the flexibility of this invention as an accurate measuring instrument for direct readout of incremental heights of a liquid. The galvanometer 34 also provides a "zero adjust" indication.

The circuit ground return 133 is isolated from the metal casing, in bus fashion. The can 21 is directly connected to the metal case 30 when resting on the table 31 or on the platforms 33 which is physically connected to the gauge housing 51 through the post 32. The connector 61 is also connected to the housing 51 and returned to the metal case 30 through the connector 81 and the shielded cable 80 through connectors 82 and 83, thus connecting the contact 164 and the adjustable arm 163 directly to the metal casing 30. Therefore, the bias voltage obtained through the adjustable arm 163 puts the metal case 30 at the same voltage level as the can 21; so there is no need for insulating or isolating the can 21 from the case 30. Hence, both the can 21 and the case 30 can be placed on an all-metal-top bench. The voltages being low-value D.-C. supplied from the battery 134 produce infinitesimally small currents, i.e. microamperes, through $R_x$; so the operator is free from shock danger.

When the switch knob 37 is turned to its "Operate" position 40, the gauge or meter 34 is removed from the circuit, and a relay circuit is put in. Instead of being connected to the meter 34 through the lead 160, the switch pole 104 is then connected by the contact 122 to a lead 170. The lead 170 is connected to the base 171 of a transistor 172 and to one side of a shunt resistor 173, which acts to stabilize the transistor functions and sets its general operating sensitivity. At the same time, instead of being connected to the opposite side of the meter 34 by the lead 159, the pole 105 is connected by the contact 123 to a lead 174. The lead 174 is connected to the emitter 175 of the transistor 172 and to the other end of the shunt resistor 173 and, preferably, to a resistor 179, typically of 47 ohms. The resistor 179 is located between lead 174 and the transistor emitter 175, and it acts to limit the transistor base and collector currents from exceeding over-load limits. The lead 174 is also connected to the positive polarity of a battery 176, the negative side of which is connected by a lead 177 to the contact 124. The pole 106 connects the contact 124 by a lead 178 to one pole of a relay coil 180. The other pole of the coil 180 is connected by a lead 181 to the collector 182 of the transistor 172, through a limiting resistor 183, which may have a value of 1,000 ohms. In parallel with the relay coil 180 (across the lines 178 and 181) is a condenser 184, which may have a value of four microfarads. The condenser 184 provides a time constant for the relay coil 180 and holds the relay closed without chattering in the presence of stray currents.

The transistor 172 provides an amplification factor of about 100, so that when the paint vehicle 22 forms a conductive path between the probe 20 and the can 21, the unbalanced circuit condition explained above and shown in FIGS. 11 and 12 is able to energize the relay coil 180 and close a relay switch 185 against a contact 186. The relay switch 185 is connected to one pole of the solenoid 70, and the contact 186 is connected to the other pole of the solenoid 70 through a 110 volt A.-C. source. Hence energization of the coil 180 actuates the solenoid 70, moving the shutoff lever 73, as already explained.

Hence when the paint vehicle 22 rises high enough to provide a relatively small but significant conductance between the can 21 and the probe 20, the circuit becomes unbalanced as in FIG. 12, the transistor 172 amplifies the unbalance and actuates the relay coil 180, which in turn, actuates the circuit that energizes the solenoid 70 and the shutoff lever 73 closes the valve 26, stopping the flow of the ingredient into the can 21. As explained before, this happens for each ingredient until the paint mixture is formulated.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A device for dispensing incremental heights of a liquid in a conductive container, including a combination:
   - an electrically conductive support for said conductive container,
   - a dispensing device having a dispensing valve,
   - a cradle for supporting said dispensing device at a pouring angle and holding it in a fixed position,
   - lever means for closing said valve mechanically,
   - a solenoid having a core connected to said lever means and actuating it for closure of said valve upon energization of said solenoid,
   - means for changing the stroke of said lever means to accommodate different sizes of dispensing devices,
   - a vertical rod movable vertically in said container and spaced from the wall thereof and having at its lower end a probe tip,
   - means to move said rod vertically,
   - height-measuring means for accurately indicating the amount of vertical movement of said rod,

- means for sending a very small electrical potential between said container wall and said probe tip, and
   - means for energizing said solenoid upon attainment of electrical conductance through this liquid between the walls of the container and the probe tip, when said liquid rises to the level of said probe tip.

2. A device for dispensing an incremental height of a liquid from a first container into a second conductive container, including in combination:
   - an electrically conductive support for said conductive container and including means for supporting the first container;
   - a valve for the first container having a slide member for opening and closing the valve and having means for manually actuating the slide member to open the valve;
   - a pivotally mounted U-shaped lever for enclosing the first container and engaging said slide member;
   - a solenoid slidably mounted in said support and having a core connected to said lever for moving said lever to engage said slide member and close said valve upon energization of said solenoid;
   - another lever pivotally mounted on said support and engaging said solenoid to move said solenoid relative to said support for changing the stroke of said U-shaped lever to accommodate different sizes to the first container;
   - a vertical rod movable vertically in said conductive container and spaced from the walls thereof and having at its lower end a probe tip;
   - means for moving said rod vertically an accurately measured amount; and
   - electrical means for energizing said solenoid upon obtainment of a predetermined value of electrical conductive of the liquid between the probe tip and the conductive container wall when the liquid reaches a predetermined height in the conductive container and forms a conductive path between the probe and said container wall.

References Cited by the Examiner

UNITED STATES PATENTS

| | | | |
|---|---|---|---|
| 2,010,062 | 8/1935 | Dawson | 141—95 |
| 2,539,206 | 10/1948 | Robinson | 317—141 |
| 2,691,475 | 10/1954 | Jordan | 141—95 |
| 2,766,406 | 10/1956 | Schwarzkopf | 317—132 |
| 2,925,101 | 2/1960 | Dunham | 141—95 |

LAVERNE D. GEIGER, *Primary Examiner.*

SAMUEL ROTHBERG, *Examiner.*

H. BELL, *Assistant Examiner.*

UNITED STATES PATENT OFFICE

CERTIFICATE OF CORRECTION

Patent No. 3,265,099 August 9, 1966

Paul J. Severino et al.

It is hereby certified that error appears in the above numbered patent requiring correction and that the said Letters Patent should read as corrected below.

Column 1, line 27, for "possible" read -- possibly --; line 49, for "in", second occurrence, read -- is --; column 7, line 43, for "iwth" read -- with --; column 8, line 18, "decerases" read -- decreases --; same line 18, for "increases" read -- increase --; column 10, line 26, for "sizes to" read -- sizes of --; line 35, for "conductive" read -- conductance --.

Signed and sealed this 1st day of August 1967.

(SEAL)
Attest:

Edward M. Fletcher, Jr.
Attesting Officer

EDWARD J. BRENNER
Commissioner of Patents